United States Patent
Wang et al.

(10) Patent No.: US 10,425,615 B2
(45) Date of Patent: Sep. 24, 2019

(54) APPARATUSES AND METHODS FOR DYNAMIC FRAME RATE ADJUSTMENT

(71) Applicant: MEDIATEK INC., Hsin-Chu (TW)

(72) Inventors: Wei-Ting Wang, Taipei (TW); Han-Lin Li, Taoyuan (TW); Yu-Jen Chen, Taoyuan (TW); Yu-Ming Lin, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 76 days.

(21) Appl. No.: 15/806,718

(22) Filed: Nov. 8, 2017

(65) Prior Publication Data

US 2018/0332252 A1     Nov. 15, 2018

Related U.S. Application Data

(60) Provisional application No. 62/504,000, filed on May 10, 2017.

(51) Int. Cl.
*H04N 7/01* (2006.01)
*G09G 5/00* (2006.01)

(52) U.S. Cl.
CPC ........... *H04N 7/0127* (2013.01); *G09G 5/005* (2013.01); *G09G 2340/0435* (2013.01); *G09G 2350/00* (2013.01); *G09G 2360/08* (2013.01)

(58) Field of Classification Search
CPC .. H04N 7/0127; G09G 5/005; G09G 2350/00; G09G 2360/08
USPC .......................................... 345/520; 348/441
See application file for complete search history.

(56) References Cited

U.S. PATENT DOCUMENTS

| | | | |
|---|---|---|---|
| 9,712,827 B2 | 7/2017 | Ono et al. | |
| 2002/0075263 A1* | 6/2002 | Kato | G06T 17/20 345/423 |
| 2014/0160136 A1* | 6/2014 | Kaburlasos | G09G 5/00 345/520 |
| 2016/0360148 A1* | 12/2016 | Mahapatro | H04N 7/0127 |

FOREIGN PATENT DOCUMENTS

| | | |
|---|---|---|
| TW | 201338546 A | 9/2013 |
| TW | 201612875 A | 4/2016 |

* cited by examiner

*Primary Examiner* — Jefferey F Harold
*Assistant Examiner* — Omer Khalid
(74) *Attorney, Agent, or Firm* — McClure, Qualey & Rodack, LLP

(57) ABSTRACT

An image processing apparatus including first circuitry, second circuitry, third circuitry, and fourth circuitry is provided. The first circuitry determines a frame miss rate according to a current frame rate and a target frame rate of an image signal. The second circuitry decreases the target frame rate to the current frame rate when the frame miss rate is greater than a first threshold. The third circuitry increases the target frame rate to an upper-limit frame rate which is determined according to the frame rendering time or memory bandwidth capability, when the frame miss rate is less than a second threshold which is smaller than the first threshold. The fourth circuitry applies the decreased or increased target frame rate for an image to be displayed.

14 Claims, 4 Drawing Sheets

APPARATUSES AND METHODS FOR DYNAMIC FRAME RATE ADJUSTMENT

CROSS REFERENCE TO RELATED APPLICATIONS

This Application claims priority of U.S. Provisional Application No. 62/504,000, filed on May 10, 2017, the entirety of which is incorporated by reference herein.

BACKGROUND OF THE APPLICATION

Field of the Application

The application relates generally to frame rate adjustment, and more particularly, to apparatuses and methods for dynamic frame rate adjustment to provide a better user experience.

Description of the Related Art

In the field of graphics and multimedia, frame rate generally refers to the rate at which frames of visual content are provided by a graphics engine. Depending on the source of the visual content, the frame rate may range from 24 Hz to over 100 Hz, or 0 Hz in the case of a static image. Alternatively, certain types of visual content have varying frame rates, or frame rates may change as different content types are displayed, e.g., film material on a television typically has a frame rate of 24 or 25 Hz, whereas video material (such as a video game) may have frame rates of 30, 50 or 60 Hz.

Although higher frame rates may provide higher visual quality, they typically tend to result in more power consumption. In order to reduce power consumption, a conventional design of frame rate adjustment configures different target frame rates for different application scenarios. However, within an application scenario, the target frame rate is static even though there may be various events with different display requirements in the same application scenario.

Instead of reducing power consumption, there is another conventional design of frame rate adjustment which aims to provide a better user experience by increasing the thermal throttling point for elevating system capability to avoid frame miss. However, this may result in high power consumption and system overheating, which can easily lead to the system entering an unstable state. In the end, user experience may not be improved as expected, and yet the cost of high power consumption is certain.

Therefore, it is desirable to have a more robust method of frame rate adjustment.

BRIEF SUMMARY OF THE APPLICATION

In one aspect of the application, an image processing apparatus is provided. The image processing apparatus comprises first circuitry, second circuitry, third circuitry, and fourth circuitry. The first circuitry is configured to determine a frame miss rate according to a current frame rate and a target frame rate of an image signal. The second circuitry is configured to decrease the target frame rate to the current frame rate when the frame miss rate is greater than a first threshold. The third circuitry is configured to increase the target frame rate to an upper-limit frame rate which is determined according to a frame rendering time or a memory bandwidth capability, when the frame miss rate is less than a second threshold which is smaller than the first threshold. The fourth circuitry is configured to apply the decreased or increased target frame rate for an image to be displayed.

In another aspect of the application, a method for dynamic frame rate adjustment, executed by a controller of an image processing apparatus, is provided. The method comprises the steps of: determining a frame miss rate according to a current frame rate and a target frame rate of an image signal generated by an image processing apparatus; decreasing the target frame rate to the current frame rate when the frame miss rate is greater than a first threshold; increasing the target frame rate to an upper-limit frame rate which is determined according to a frame rendering time or a memory bandwidth capability, when the frame miss rate is less than a second threshold which is smaller than the first threshold; and applying the decreased or increased target frame rate for an image displayed by the image processing apparatus.

Other aspects and features of the application will become apparent to those with ordinary skill in the art upon review of the following descriptions of specific embodiments of the image processing apparatuses and methods for dynamic frame rate adjustment.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Please note that the term "frame rate" used herein may refer to the rate at which frames of visual content are provided. In a preferred embodiment, the frame rate may be represented in Frames Per Second (FPS).

Figure 1:
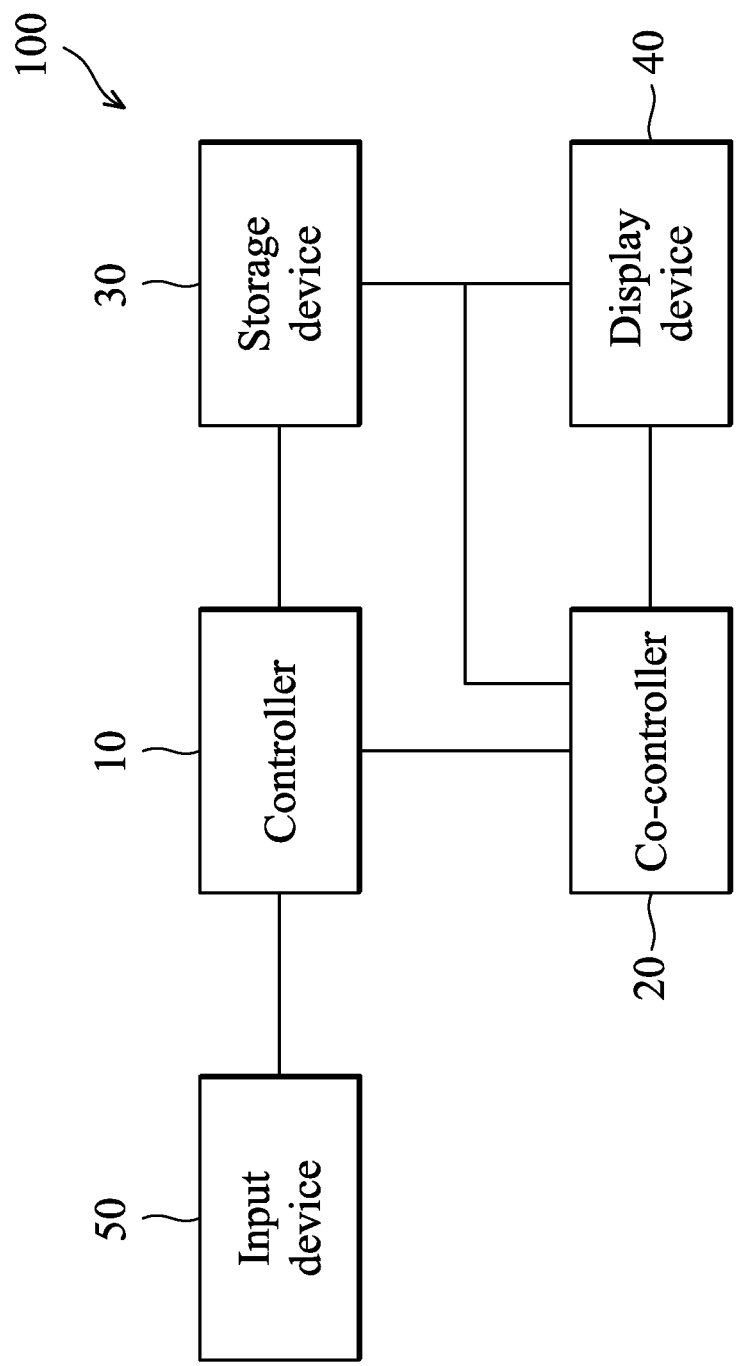
FIG. 1 is a block diagram illustrating an image processing apparatus according to an embodiment of the application.

FIG. 1 is a block diagram illustrating an image processing apparatus according to an embodiment of the application. The image processing apparatus 100 includes a controller 10, a co-controller 20, a storage device 30, a display device 40, and an input device 50, wherein the co-controller 20, the storage device 30, and the input device 50 are coupled to the controller 10, and the co-controller 20 and the storage device 30 are coupled to each other and to the display device 40. For example, the image processing apparatus 100 may be a mobile phone, panel Personal Computer (PC), notebook, gaming console, or any electronic device with a display function.

The controller 10 may be a general-purpose processor, Central Processing Unit (CPU), Micro-Control Unit (MCU), Digital Signal Processor (DSP), application processor, or the like, which includes various circuitry for providing the function of data processing and computing, controlling the co-controller 20 for image rendering, storing and retrieving data to and from the storage device 30, and/or receiving signals from the input device 50.

The co-controller 20 may be used to offload image processing tasks from the controller 10, thereby allowing the controller 10 to handle other processing tasks. The co-controller 20 may include one or more suitably configured graphic processors such as a suitably configured discrete or integrated graphics processor (e.g., a Graphics Processing Unit (GPU)), or processors designed for specific devices such as digital televisions or handheld/mobile devices. Specifically, the co-controller 20 includes various circuitry for providing the function of image processing and computing, receiving control signals from the controller 10, storing and retrieving data to and from the storage device 30, and/or sending a series of frame data (e.g. representing text messages, graphics, images, etc.) to the storage device 30 or the display device 40. For example, the frame data may be sent direct to the display device 40, or may be sent to the storage device 30 where the display device 40 may retrieve it from. The co-controller 20 may be used to offload image processing tasks from the controller 10, thereby allowing the controller 10 to handle other processing tasks.

As will be appreciated by persons skilled in the art, the circuitry in the controller 10 and the co-controller 20 will typically comprise transistors that are configured in such a way as to control the operation of the circuitry in accordance with the functions and operations described herein. As will be further appreciated, the specific structure or interconnections of the transistors will typically be determined by a compiler, such as a register transfer language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Random Access Memory (RAM), or a magnetic storage device, such as a hard disk or a magnetic tape, or an optical disc, or any combination thereof for storing data, such as frame data, and program code of communication protocols, applications (e.g., gaming applications), and the method of the present application.

In particular, the program code of the method of the present application may be loaded and executed by the controller 10 or the co-controller 20.

Alternatively, the image processing apparatus 100 may further include a frame rate controller which is coupled to at least one of the controller 10, the co-controller 20, the storage device 30, and the display device 40, and is dedicated for controlling the frame rate. Specifically, the frame rate controller may include various circuitry for providing the function of frame rate control, by loading and executing the program code of the method of the present application from the storage device 30.

The display device 40 may be a Cathode Ray Tube (CRT) display, Liquid-Crystal Display (LCD), Light-Emitting Diode (LED) display, or Electronic Paper Display (EPD), etc., for providing a display function according to the frame data received or read from the co-controller 20 or the storage device 30. Alternatively, the display device 40 may further include one or more touch sensors disposed thereon or thereunder for sensing touches, contacts, or approximations of objects, such as fingers or styluses.

The input device 50 may include one or more buttons, a keyboard, a mouse, a touch pad, a video camera, a microphone, and/or a speaker, etc., serving as the Man-Machine Interface (MIMI) for interaction with users.

It should be understood that the components described in the embodiment of FIG. 1 are for illustrative purposes only and are not intended to limit the scope of the application. For example, the display device 40 may be realized as an external display outside of the image processing apparatus 100, or the image processing apparatus 100 may further include a Global Positioning System (GPS) for providing location information, a power supply (e.g., a battery) for providing power to the other components, and/or wireless transceiver for providing the function of wireless communications, etc.

Figure 2:
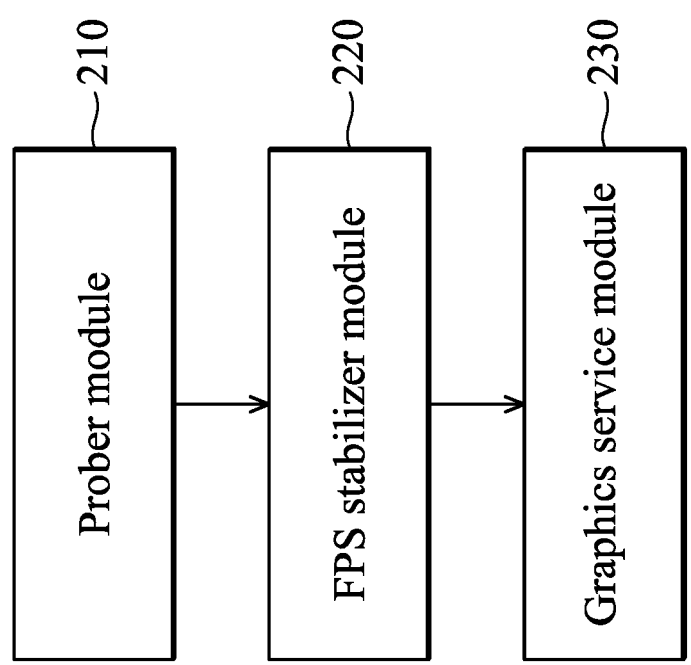
FIG. 2 is a block diagram illustrating the software architecture of the method for dynamic frame rate adjustment according to an embodiment of the application.

FIG. 2 is a block diagram illustrating the software architecture of the method for dynamic frame rate adjustment according to an embodiment of the application. The software architecture includes a prober module 210, a FPS stabilizer module 220, and a graphics service module 230, wherein each module may be a software module implemented with program code and executed by a controller (e.g., the controller 10, the co-controller 20, or a frame rate controller) to collaborate with each other for performing dynamic frame rate adjustment.

The prober module 210 is responsible for collecting statistics from the hardware components of the image processing apparatus 100, including the controller 10, the co-controller 20, and the storage device 30. Specifically, the statistics include the current frame rate used for image rendering, the frame rendering times required by the controller 10 and the co-controller 20, the current and maximum Operating Performance Points (OPP) of the controller 10 and the co-controller 20, and the throughput and maximum available bandwidth of the storage device 30 (e.g., memory throughput and maximum available memory bandwidth).

The FPS stabilizer module 220 is responsible for dynamically adjusting the target frame rate according to the statistics provided by the prober module 210. Specifically, the FPS stabilizer module 220 determines the frame miss rate by subtracting the current frame rate from the target frame rate and dividing the subtraction result by the target frame rate, compares the frame miss rate with at least two thresholds, and adjust the target frame rate according to the comparison results and the statistics provided by the prober module 210.

The graphics service module 230 is responsible for applying the target frame rate to graphics services, such as gaming applications, which generate image signals to be displayed by the image processing apparatus 100.

Figure 3:
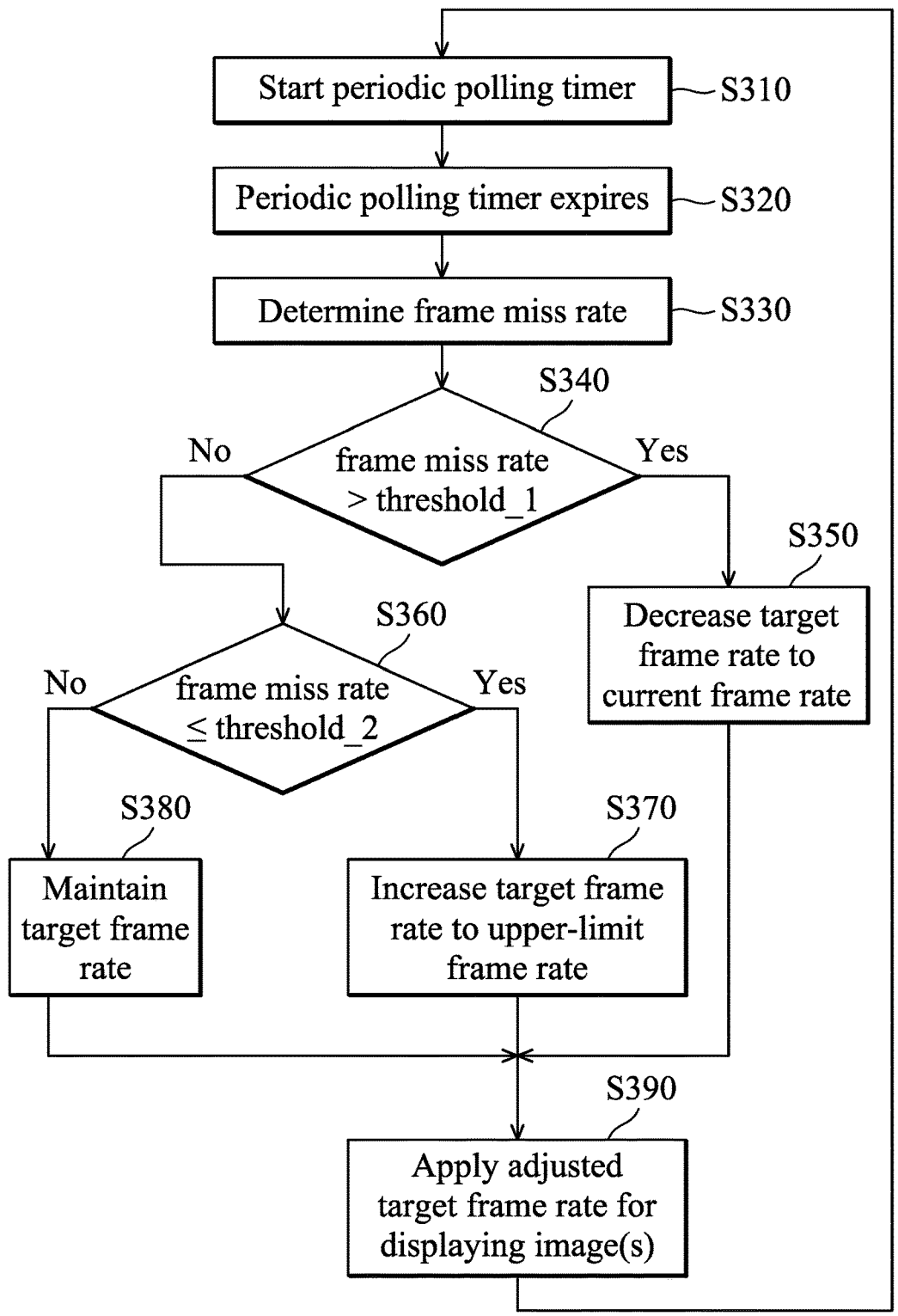
FIG. 3 is a flow chart illustrating the method for dynamic frame rate adjustment according to an embodiment of the application.

FIG. 3 is a flow chart illustrating the method for dynamic frame rate adjustment according to an embodiment of the application. In this embodiment, the method is applied to an image processing apparatus (e.g., the image processing apparatus 100), and more specifically, is executed by a controller (e.g., the controller 10, the co-controller 20, or a frame rate controller other than the controller 10 and the co-controller 20) of the image processing apparatus, wherein the controller includes various circuitry for providing the function of data processing and computing to carry out the method of the present application.

In step S310, the image processing apparatus starts a periodic polling timer to count a predetermined period of time.

In step S320, the periodic polling timer expires and the method proceeds to the next step.

In step S330, the image processing apparatus determines the frame miss rate according to the current frame rate and the target frame rate. Specifically, the frame miss rate is determined by subtracting the current frame rate from the target frame rate and dividing the subtraction result by the target frame rate.

In one embodiment, the current frame rate may refer to the number of frames processed by the Android display manager per second. In another embodiment, the current frame rate may refer to the number of frames processed by the Surfaceflinger per second. Alternatively, the current frame rate may be determined by the interval between the times of two successive events of a frame stored into the queue buffer.

In step S340, the image processing apparatus determines whether the frame miss rate is greater than a first threshold, and if so, the method proceeds to step S350. In one embodiment, the first threshold may be configured to be 0.02.

In step S350, the image processing apparatus decreases the target frame rate to the current frame rate.

Subsequent to step S340, if the frame miss rate is less than or equal to the first threshold, the method proceeds to step S360.

In step S360, the image processing apparatus determines whether the frame miss rate is less than or equal to a second threshold, and if so, the method proceeds to step S370. Specifically, the second threshold is smaller than the first threshold. In one embodiment, the second threshold may be configured to be within the range from zero to the first threshold. For example, the first threshold may be configured to be 0.02, and the second threshold may be configured to be 0.01.

In step S370, the image processing apparatus increases the target frame rate to the upper-limit frame rate, wherein the upper-limit frame rate is determined according to a frame rendering time and/or a memory bandwidth capability. Specifically, the frame rendering time refers to the period of time required for a controller, such as a CPU or a GPU, to process a frame.

Figure 4:
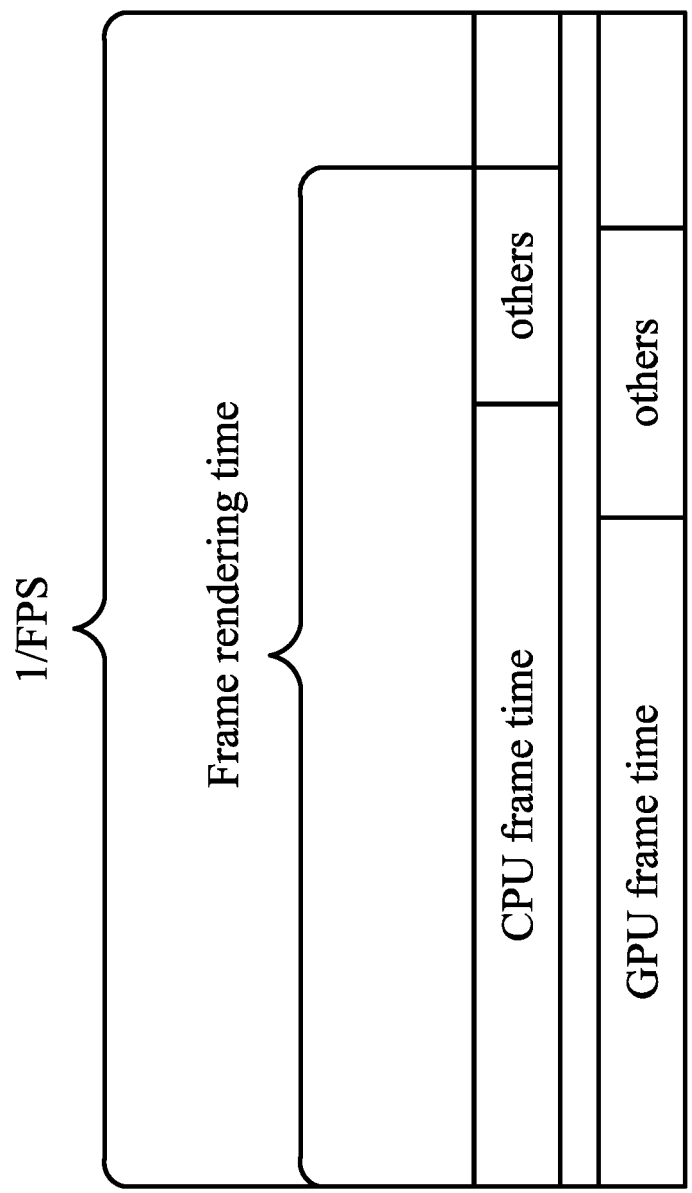
FIG. 4 is a schematic diagram illustrating a frame rendering time according to an embodiment of the application.

FIG. 4 is a schematic diagram illustrating a frame rendering time according to an embodiment of the application. As shown in FIG. 4, the period of time representing the frame rendering time may refer to the actual CPU/GPU processing time (denoted as CPU/GPU frame time in FIG. 4) plus the time that the frame rendering task is preempted by other threads.

The memory bandwidth capability refers to the result of dividing the maximum available memory bandwidth by the memory bandwidth used per frame, wherein the memory bandwidth used per frame equals the memory throughput divided by the current frame rate.

Alternatively, the frame rendering time may refer to the result of multiplying the period of time required for a controller to process a frame by a boost headroom. The boost headroom may be determined by dividing a first performance index by a second performance index, wherein the first performance index indicates the performance level of the image processing apparatus operating at the current system capability, and the second performance index indicates the performance level of the image processing apparatus operating at the maximum system capability. The current system capability may refer to the current OPP or Dynamic Voltage and Frequency Scaling (DVFS) of the image processing apparatus, while the maximum system capability may refer to the maximum OPP or DVFS of the image processing apparatus.

For example, the current OPP/DVFS may be represented by the frequency and voltage currently applied to the controller (e.g., CPU or GPU), such as {frequency=300 MHz, voltage=1 V}, and the maximum OPP/DVFS may be represented by the maximum frequency and voltage that may be configured for the controller (e.g., CPU or GPU), such as {frequency=1 GHz, voltage=1.3 V}.

Accordingly, the first performance index may be represented by a score (e.g., 1020) obtained using a benchmark to test the image processing apparatus with the current OPP/DVFS, the second performance index may be represented by a score (e.g., 3000) obtained using a benchmark to test the image processing apparatus with the maximum OPP/DVFS.

In one embodiment, the upper-limit frame rate is determined using the reciprocal of the frame rendering time.

In another embodiment, the upper-limit frame rate is determined by selecting the minimum among the memory bandwidth capability and the reciprocal of the frame rendering time. For example, the upper-limit frame rate equals the minimum among the memory bandwidth capability, the reciprocal of the CPU frame rendering time, and the reciprocal of the GPU frame rendering time.

Subsequent to step S360, if the frame miss rate is greater than the second threshold, the method proceeds to step S380.

In step S380, the image processing apparatus maintains the target frame rate.

Subsequent to steps S350, S370, and S380, the method proceeds to step S390.

In step S390, the image processing apparatus applies the adjusted target frame rate for displaying image(s), and the method ends.

In view of the forgoing embodiments, it will be appreciated that the present application realizes dynamic frame rate adjustment by using the frame miss rate as the main reference for determining whether or not to adjust the target frame rate and taking various system hints (e.g., FPS, CPU/GPU frame rendering time, and memory bandwidth capability) into account for determining how to adjust the target frame rate. Advantageously, the method of the present application may achieve smooth displays of images, thereby providing a better user experience.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", and "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. An image processing apparatus, comprising:
 first circuitry, configured to determine a frame miss rate according to a current frame rate and a target frame rate of an image signal, wherein the frame miss rate is determined by subtracting the current frame rate from the target frame rate and dividing the subtraction result by the target frame rate;

second circuitry, configured to decrease the target frame rate to the current frame rate when the frame miss rate is greater than a first threshold;

third circuitry, configured to increase the target frame rate to an upper-limit frame rate which is determined according to a frame rendering time or a memory bandwidth capability, when the frame miss rate is less than a second threshold which is smaller than the first threshold; and fourth circuitry, configured to apply the decreased or increased target frame rate for an image to be displayed.

2. The image processing apparatus as claimed in claim 1, further comprising:

fifth circuitry configured to maintain the target frame rate when the frame miss rate is less than the first threshold and greater than the second threshold.

3. The image processing apparatus as claimed in claim 1, wherein the upper-limit frame rate is determined using a reciprocal of the frame rendering time.

4. The image processing apparatus as claimed in claim 1, wherein the frame rendering time indicates a period of time required for a Central Processing Unit (CPU) or a Graphics Processing Unit (GPU) to process a frame.

5. The image processing apparatus as claimed in claim 1, further comprising:

sixth circuitry configured to determine a first performance index for the image processing apparatus operating at a current system capability, and a second performance index for the image processing apparatus operating at a maximum system capability;

wherein the frame rendering time indicates a result of multiplying a period of time required for a Central Processing Unit (CPU) or a Graphics Processing Unit (GPU) to process a frame, by the result of dividing the first performance index by the second performance index.

6. The image processing apparatus as claimed in claim 1, wherein the upper-limit frame rate is determined by selecting the minimum among the memory bandwidth capability and a reciprocal of the frame rendering time.

7. The image processing apparatus as claimed in claim 1, wherein the memory bandwidth capability indicates the result of dividing maximum available memory bandwidth by memory bandwidth used per frame.

8. A method for dynamic frame rate adjustment, executed by a controller of an image processing apparatus, the method comprising:

determining a frame miss rate according to a current frame rate and a target frame rate of an image signal generated by an image processing apparatus, wherein the frame miss rate is determined by subtracting the current frame rate from the target frame rate and dividing the subtraction result by the target frame rate;

decreasing the target frame rate to the current frame rate when the frame miss rate is greater than a first threshold;

increasing the target frame rate to an upper-limit frame rate which is determined according to a frame rendering time or a memory bandwidth capability, when the frame miss rate is less than a second threshold which is smaller than the first threshold; and applying the decreased or increased target frame rate for an image displayed by the image processing apparatus.

9. The method as claimed in claim 8, further comprising:

maintaining the target frame rate when the frame miss rate is less than the first threshold and greater than the second threshold.

10. The method as claimed in claim 8, wherein the upper-limit frame rate is determined using a reciprocal of the frame rendering time.

11. The method as claimed in claim 8, wherein the frame rendering time indicates a period of time required for a Central Processing Unit (CPU) or a Graphics Processing Unit (GPU) to process a frame.

12. The method as claimed in claim 8, further comprising:

determining a first performance index for the image processing apparatus operating at a current system capability, and a second performance index for the image processing apparatus operating at a maximum system capability;

wherein the frame rendering time indicates the result of multiplying a period of time required for a Central Processing Unit (CPU) or a Graphics Processing Unit (GPU) to process a frame, by the result of dividing the first performance index by the second performance index.

13. The method of claim 8, wherein the upper-limit frame rate is determined by selecting the minimum among the memory bandwidth capability and a reciprocal of the frame rendering time.

14. The method of claim 8, wherein the memory bandwidth capability indicates the result of dividing a maximum available memory bandwidth by a memory bandwidth used per frame.

* * * * *